United States Patent
Noyes

(10) Patent No.: US 8,140,780 B2
(45) Date of Patent: Mar. 20, 2012

(54) SYSTEMS, METHODS, AND DEVICES FOR CONFIGURING A DEVICE

(75) Inventor: Harold B Noyes, Boise, ID (US)

(73) Assignee: Micron Technology, Inc., Boise, ID (US)

(*) Notice: Subject to any disclaimer, the term of this patent is extended or adjusted under 35 U.S.C. 154(b) by 453 days.

(21) Appl. No.: 12/347,403

(22) Filed: Dec. 31, 2008

(65) Prior Publication Data

US 2010/0169538 A1 Jul. 1, 2010

(51) Int. Cl.
*G06F 13/28* (2006.01)
(52) U.S. Cl. ........ 711/156; 711/100; 707/601; 707/687; 707/736; 707/758; 707/790; 712/10; 712/220; 714/1; 717/168; 382/159
(58) Field of Classification Search ................... None
See application file for complete search history.

(56) References Cited

U.S. PATENT DOCUMENTS

| | | | | |
|---|---|---|---|---|
| 3,849,762 A * | 11/1974 | Fujimoto et al. | ............. | 382/209 |
| 3,921,136 A * | 11/1975 | Bar-Lev | ............. | 382/295 |
| 4,011,547 A * | 3/1977 | Kimmel | ............. | 712/208 |
| 4,014,000 A * | 3/1977 | Uno et al. | ............. | 382/203 |
| 4,123,695 A * | 10/1978 | Hale et al. | ............. | 318/561 |
| 4,153,897 A * | 5/1979 | Yasuda et al. | ............. | 382/216 |
| 4,204,193 A * | 5/1980 | Schroeder | ............. | 382/292 |
| 4,414,685 A * | 11/1983 | Sternberg | ............. | 382/257 |
| 4,748,674 A * | 5/1988 | Freeman | ............. | 382/157 |
| 5,014,327 A * | 5/1991 | Potter et al. | ............. | 382/220 |
| 5,216,748 A | 6/1993 | Quenot et al. | | |
| 5,300,830 A | 4/1994 | Hawes | | |
| 5,331,227 A | 7/1994 | Hawes | | |
| 5,459,798 A * | 10/1995 | Bailey et al. | ............. | 382/218 |
| 5,754,878 A * | 5/1998 | Asghar et al. | ............. | 712/35 |
| 5,896,548 A * | 4/1999 | Ofek | ............. | 710/20 |
| 6,016,361 A * | 1/2000 | Hongu et al. | ............. | 382/209 |
| 6,041,405 A * | 3/2000 | Green | ............. | 712/213 |
| 6,240,003 B1 | 5/2001 | McElroy | | |
| 6,279,128 B1 * | 8/2001 | Arnold et al. | ............. | 714/49 |
| 6,400,996 B1 * | 6/2002 | Hoffberg et al. | ............. | 700/83 |
| 6,606,699 B2 * | 8/2003 | Pechanek et al. | ............. | 712/16 |
| 6,633,443 B1 * | 10/2003 | Watanabe et al. | ............. | 360/45 |
| 6,640,262 B1 | 10/2003 | Uppunda et al. | | |
| 6,880,087 B1 | 4/2005 | Carter | | |

(Continued)

FOREIGN PATENT DOCUMENTS

WO 0065425 11/2000

OTHER PUBLICATIONS

Reetinder Sidhu et al, "String Matching on Multicontext FPGAs using Self-Configuration", Department of EE-System, University of Southern California, 1999.*

(Continued)

*Primary Examiner* — Hung Le
(74) *Attorney, Agent, or Firm* — Fletcher Yoder

(57) ABSTRACT

Disclosed are methods and devices, among which is a method for configuring an electronic device. In one embodiment, an electronic device may include one or more memory locations having stored values representative of the capabilities of the device. According to an example configuration method, a configuring system may access the device capabilities from the one or more memory locations and configure the device based on the accessed device capabilities.

21 Claims, 15 Drawing Sheets

U.S. PATENT DOCUMENTS

| | | | |
|---|---|---|---|
| 6,906,938 | B2 | 6/2005 | Kaginele |
| 6,944,710 | B2 | 9/2005 | Regev et al. |
| 7,089,352 | B2 | 8/2006 | Regev et al. |
| 7,146,643 | B2 | 12/2006 | Dapp et al. |
| 7,392,229 | B2 | 6/2008 | Harris et al. |
| 7,487,542 | B2 * | 2/2009 | Boulanger et al. ............ 726/23 |
| 7,890,923 | B2 * | 2/2011 | Elaasar ........................ 717/104 |
| 2004/0125807 | A1 | 7/2004 | Liu |
| 2006/0195496 | A1 * | 8/2006 | Vadi et al. ..................... 708/200 |
| 2007/0005869 | A1 | 1/2007 | Balraj et al. |
| 2007/0075878 | A1 | 4/2007 | Furodet et al. |
| 2007/0127482 | A1 | 6/2007 | Harris et al. |
| 2007/0150623 | A1 * | 6/2007 | Kravec et al. ..................... 710/1 |
| 2007/0282833 | A1 | 12/2007 | McMillen et al. |

OTHER PUBLICATIONS

Viitanen et al, "Image Pattern Recognition using Configurable Logic Cell Array", To Appear in Proc Computer Grpahics International, Leeks UK, 1989.*

Cong et al, "Application-Specific Instruciton Generation for Configurable Processor Architectures", Computer Science Department, University of California, ACM, 2004.*

Carpenter et al, "A Massively Parallel Architecture for a Self-Organizing Neural Pattern Recognition Machine", Academic Press, Inc. 1987.*

Kutrib et al, "Massively Parallel Pattern Recognition with Link Features", IFIG Research Report 0003, 2000.*

Glette et al, "An Online EHW Pattern Recognition System Applied to Face Image Recognition", University of Oslo, Norway, 2007.*

Kawai et al, "An Adaptive Pattern Recognition Hardware with On-chip Shift Register-based Partial Reconfiguration", IEEE, 2008.*

Yasunaga et al, "Kernel-based Pattern Recognition Hardware: Its Design Methodology Using Evolved Truth Tables", IEEE, 2000.*

U.S. Appl. No. 60/652,738, filed Feb. 12, 2005, Harris et al.
U.S. Appl. No. 12/253,966, filed Oct. 18, 2008, Noyes.
U.S. Appl. No. 12/253,967, filed Oct. 18, 2008, Noyes et al.
U.S. Appl. No. 12/265,421, filed Nov. 5, 2008, Noyes.
U.S. Appl. No. 12/265,465, filed Nov. 5, 2008, Noyes.
U.S. Appl. No. 12/265,436, filed Nov. 5, 2008, Noyes et al.
U.S. Appl. No. 12/268,270, filed Nov. 10, 2008, Noyes et al.
U.S. Appl. No. 12/325,875, filed Dec. 1, 2008, Noyes.
U.S. Appl. No. 12/325,982, filed Dec. 1, 2008, Noyes.
U.S. Appl. No. 12/325,986, filed Dec. 1, 2008, Noyes.
U.S. Appl. No. 12/325,990, filed Dec. 1, 2008, Noyes.
U.S. Appl. No. 12/350,132, filed Jan. 7, 2009, Pawlowski.
U.S. Appl. No. 12/350,136, filed Jan. 7, 2009, Pawlowski.
U.S. Appl. No. 12/350,142, filed Jan. 7, 2009, Pawlowski.
U.S. Appl. No. 12/352,311, filed Jan. 12, 2009, Noyes.

Beesley, K. R.; Arabic Morphology Using Only Finite-State Operations; Xerox Research Centre Europe; pp. 50-57.

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE.

Bispo, J. et al.; Synthesis of Regular Expressions Targeting FPGAs: Current Status and Open Issues; IST/INESC-ID, Libson, Portugal; pp. 1-12.

Brodie, B. et al.; A scalable Architecture for High-Throughput Regular-Expression Pattern Matching; Exegy Inc.; pp. 1-12.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12th Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17.

Fide, S.; String Processing in Hardware; Scalable Parallel and Distributed Systems Lab; Proceedings of the 12th Annual IEEE symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21.

Korenek, J.; Traffic Scanner-Hardware Accelerated Intrusion Detection System; http://www.liberouter.org/ ;2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky® Accelerated Antivirus Solution Platform for OEM Vendors; Freescale Semiconductors Document; pp. 1-16; 2007.

Hurson A. R.; A VLSI Design for the Parallel Finite State Automaton and Its Performance Evaluation as a Hardware Scanner; International Journal of Computer and Information Sciences, vol. 13, No. 6. 1984.

* cited by examiner

SYSTEMS, METHODS, AND DEVICES FOR CONFIGURING A DEVICE

BACKGROUND

1. Field of Invention

Embodiments of the invention relate generally to electronic devices and, more specifically, in certain embodiments, to the configuration of such devices.

2. Description of Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Computing hardware, such as hardware that performs the pattern recognition tasks noted above, may interface with a number of other devices or systems. For example, pattern recognition devices may be included in processor-based systems to detect desired patterns in a data stream. Such computing hardware may be provided in a variety of different devices having capabilities different from one another. A manufacturer may choose to make a "family" of electronic devices that provide at least somewhat similar functionality, but that have differences in capabilities or other characteristics. In some instances, such a family may include, in increasing order of capabilities, a basic device, a standard device, a deluxe device, and an ultra-deluxe device. The varying capabilities of these devices, however, often require each device to be configured in a uniform and rigid manner. This is believed to limit flexibility in designing and configuring members of a family of devices, and is believed to add to the design and implementation costs associated with such devices.

DETAILED DESCRIPTION OF SPECIFIC EMBODIMENTS

Figure 1:
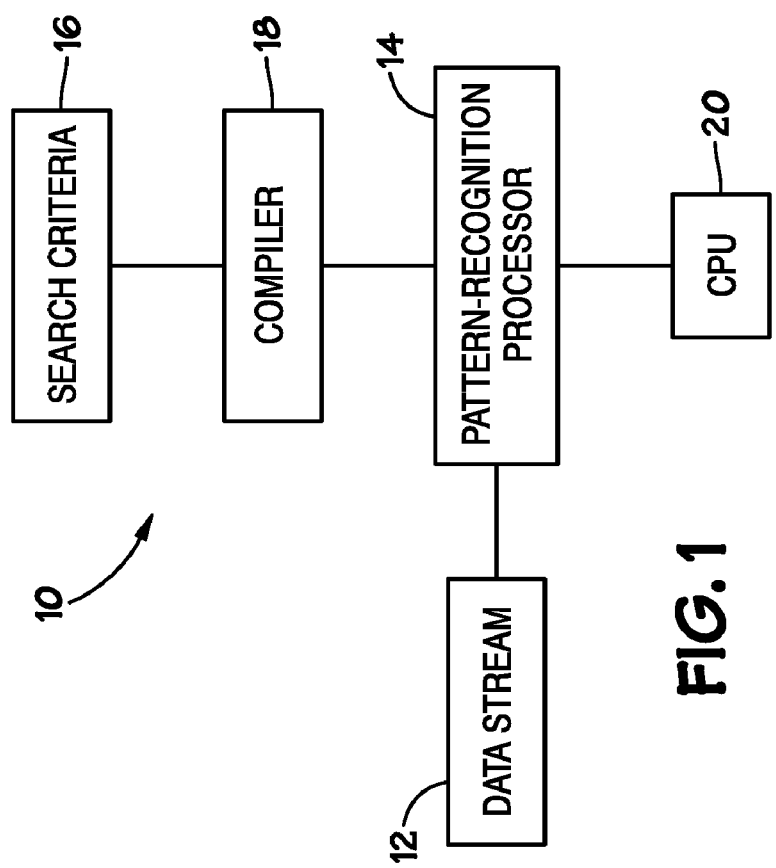
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Alternatively, the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern-recognition processor 14 may be hardware that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
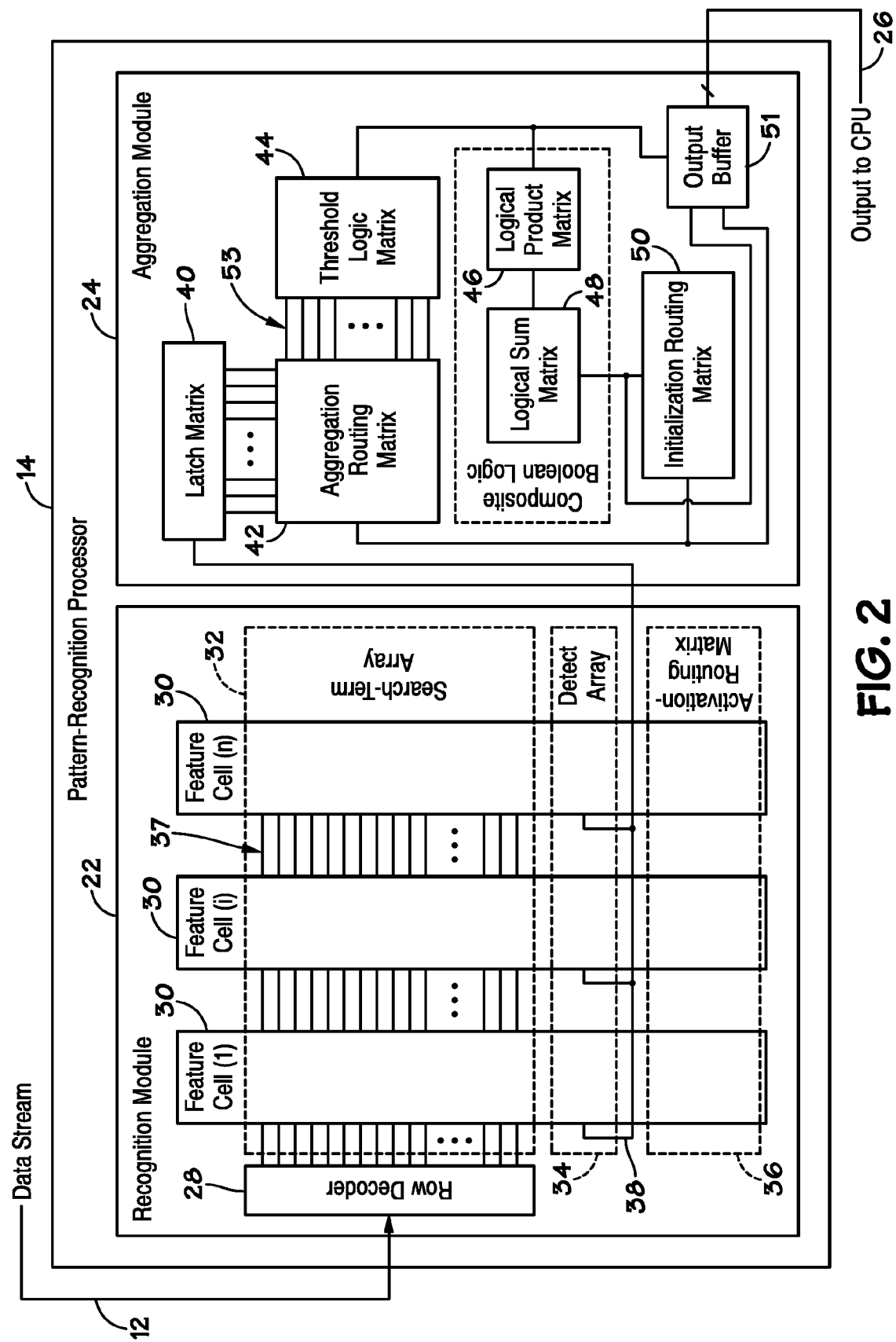
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
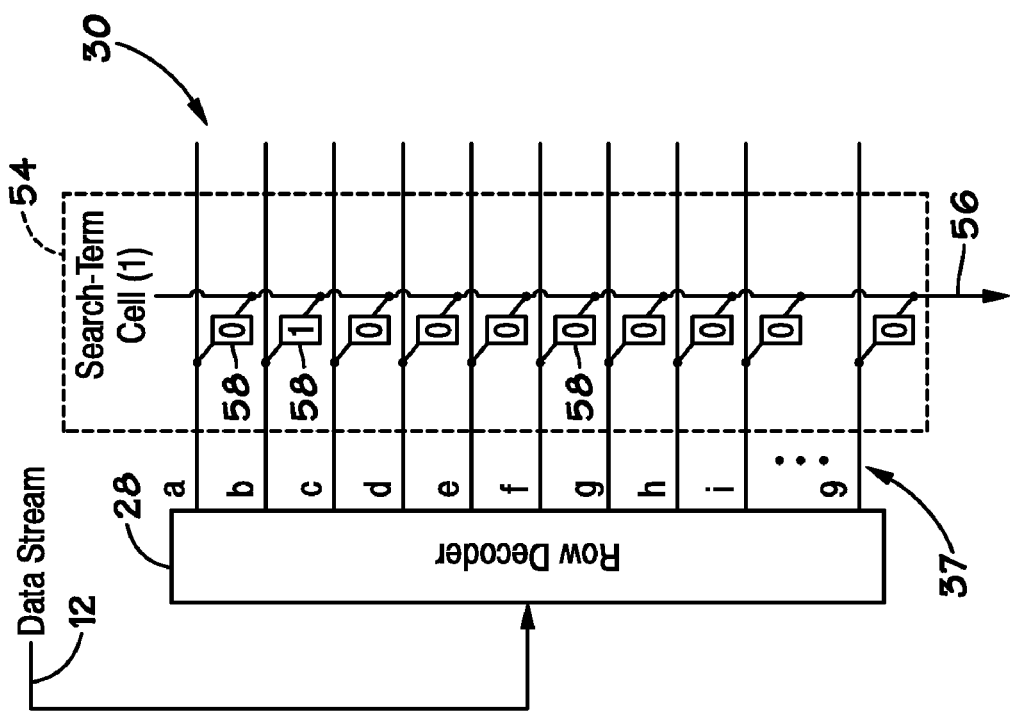
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of non-volatile memory. The memory cells 58 may also include flip-flops, e.g., memory cells made out of logic gates.

Figure 4:
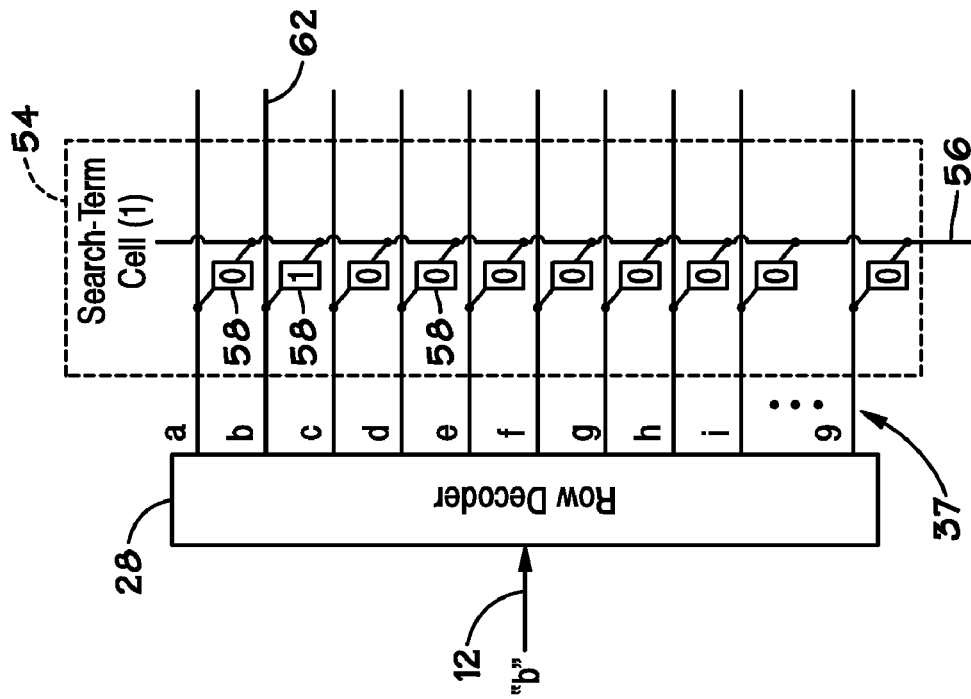
FIGS. 4 and 5 depict the search-term cell of FIG. 3 searching the data stream for a single character.
Figure 5:
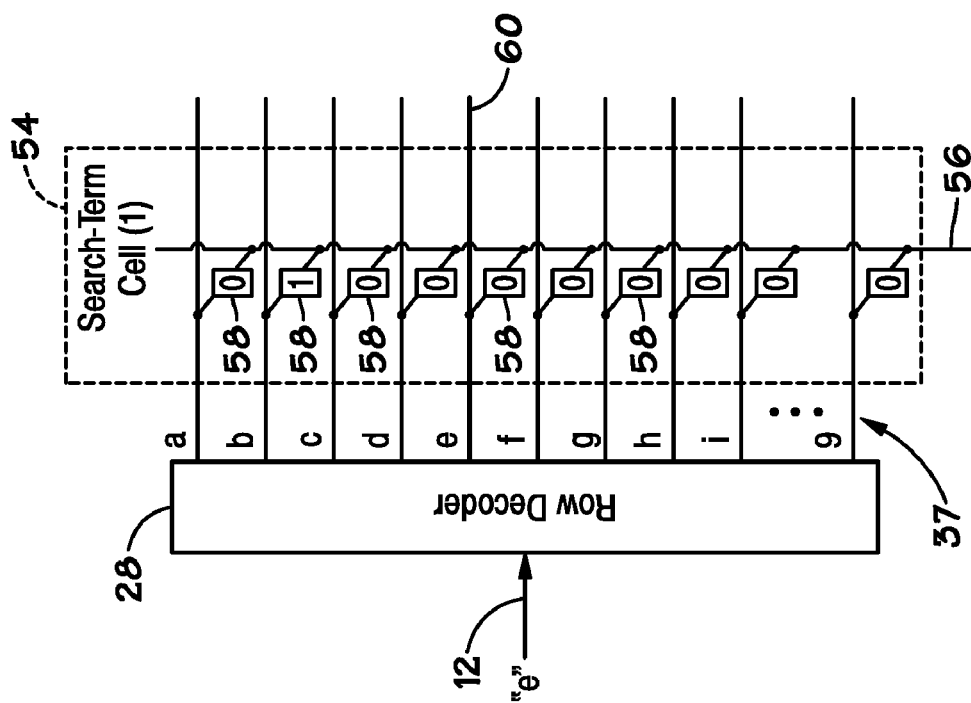

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
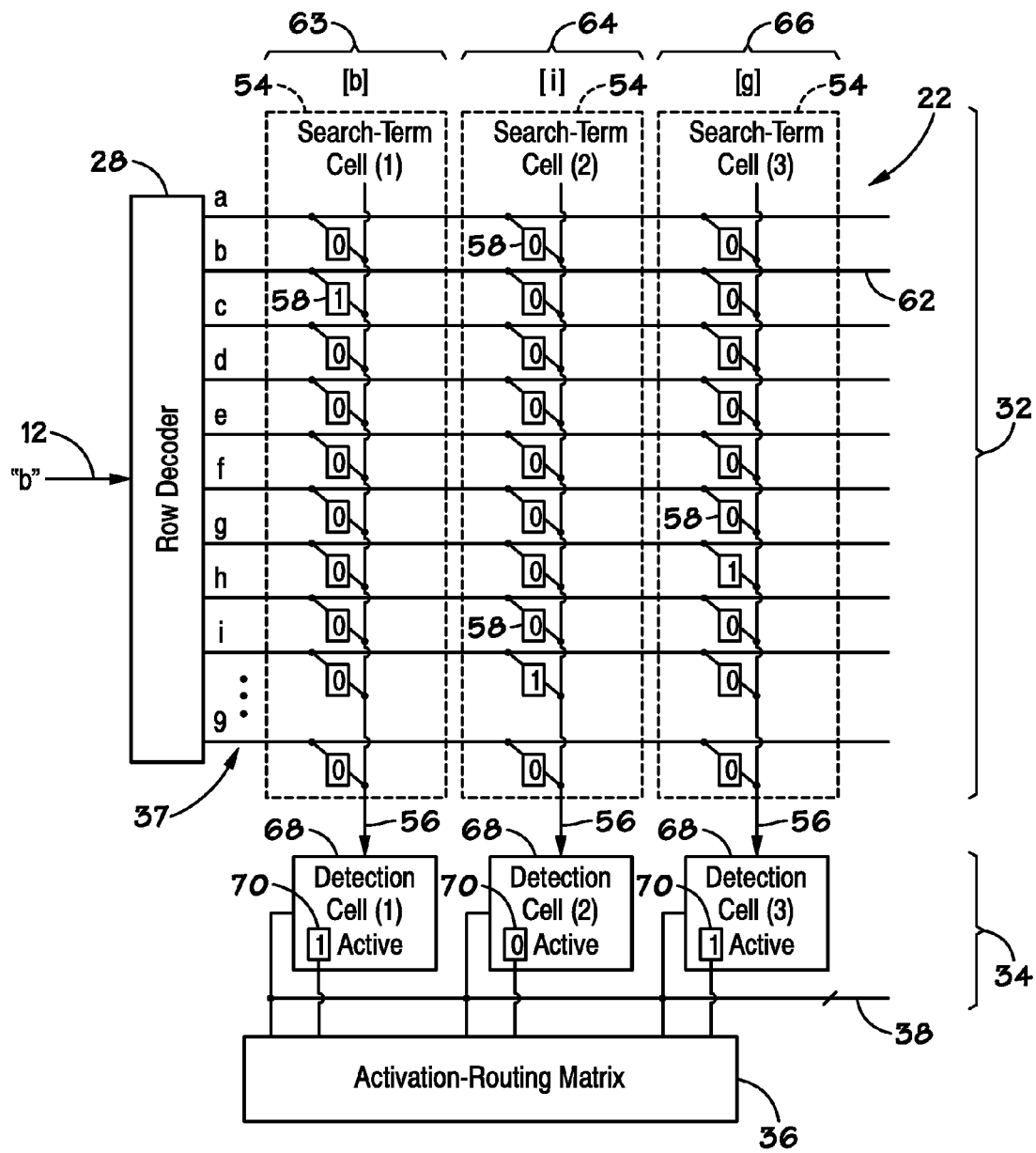
FIGS. 6-8 depict a recognition module including several search-term cells searching the data stream for a word.
Figure 7:
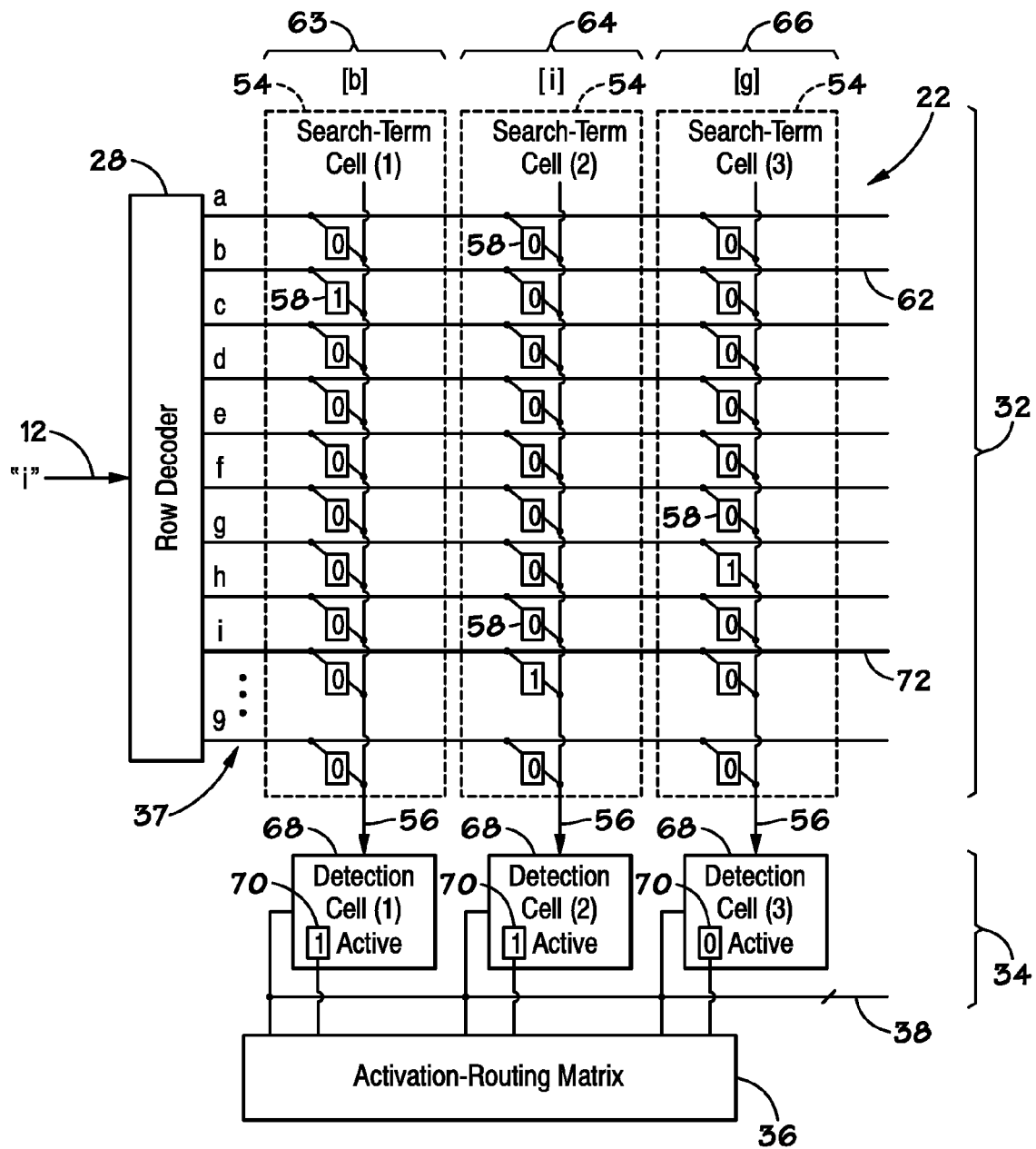
Figure 8:
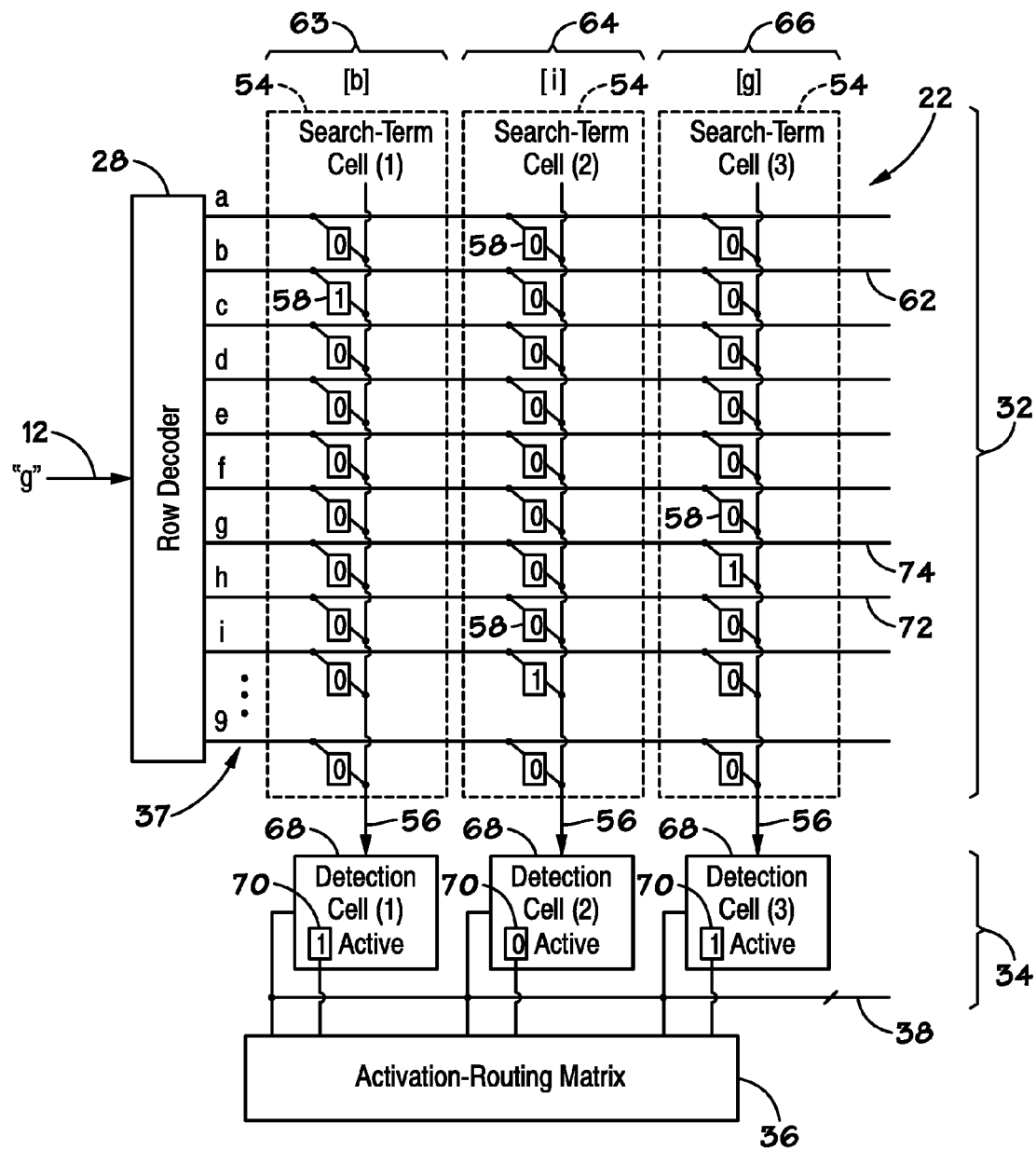

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". The feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cells 68 are active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 68 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which is active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell. The self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
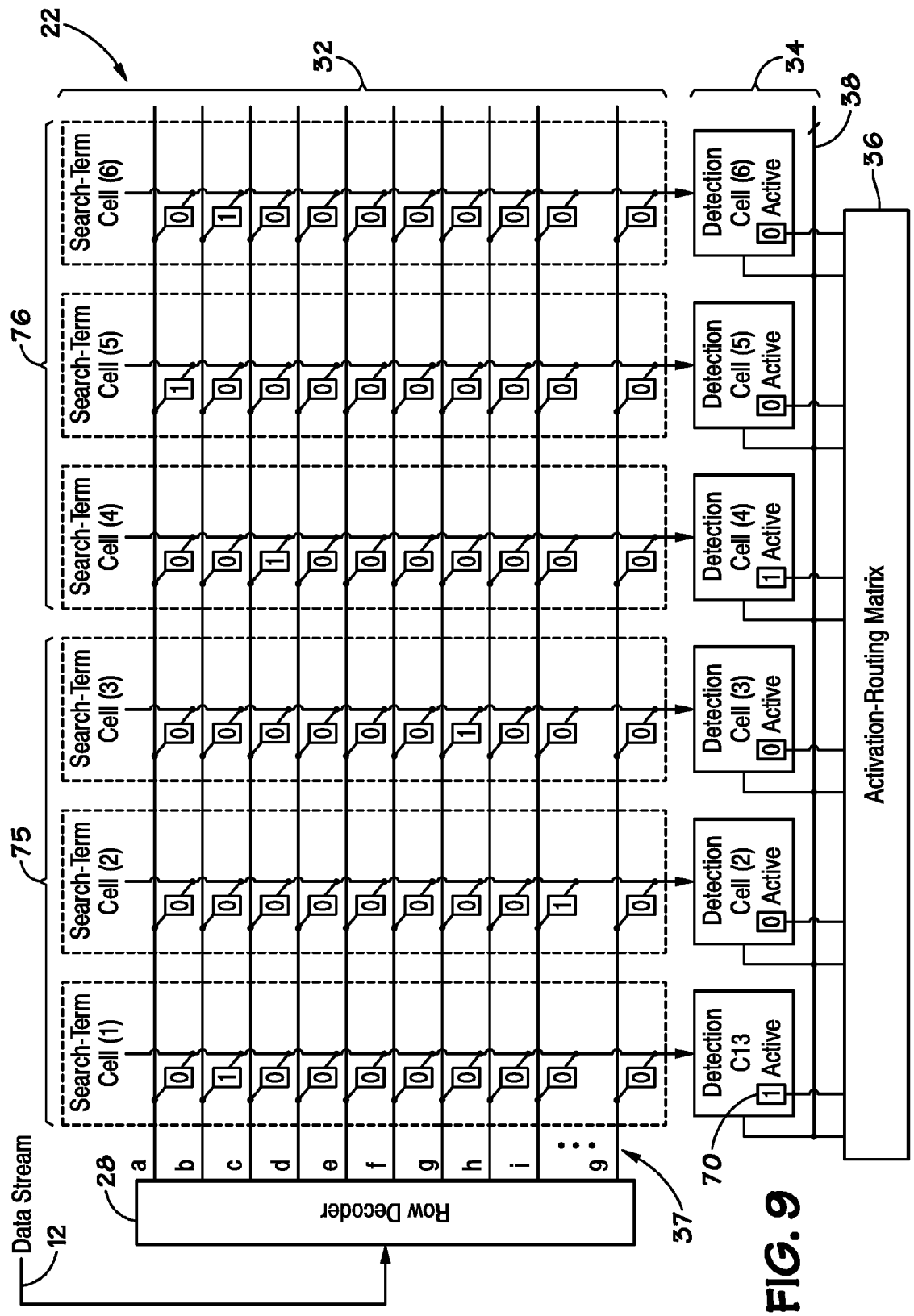
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
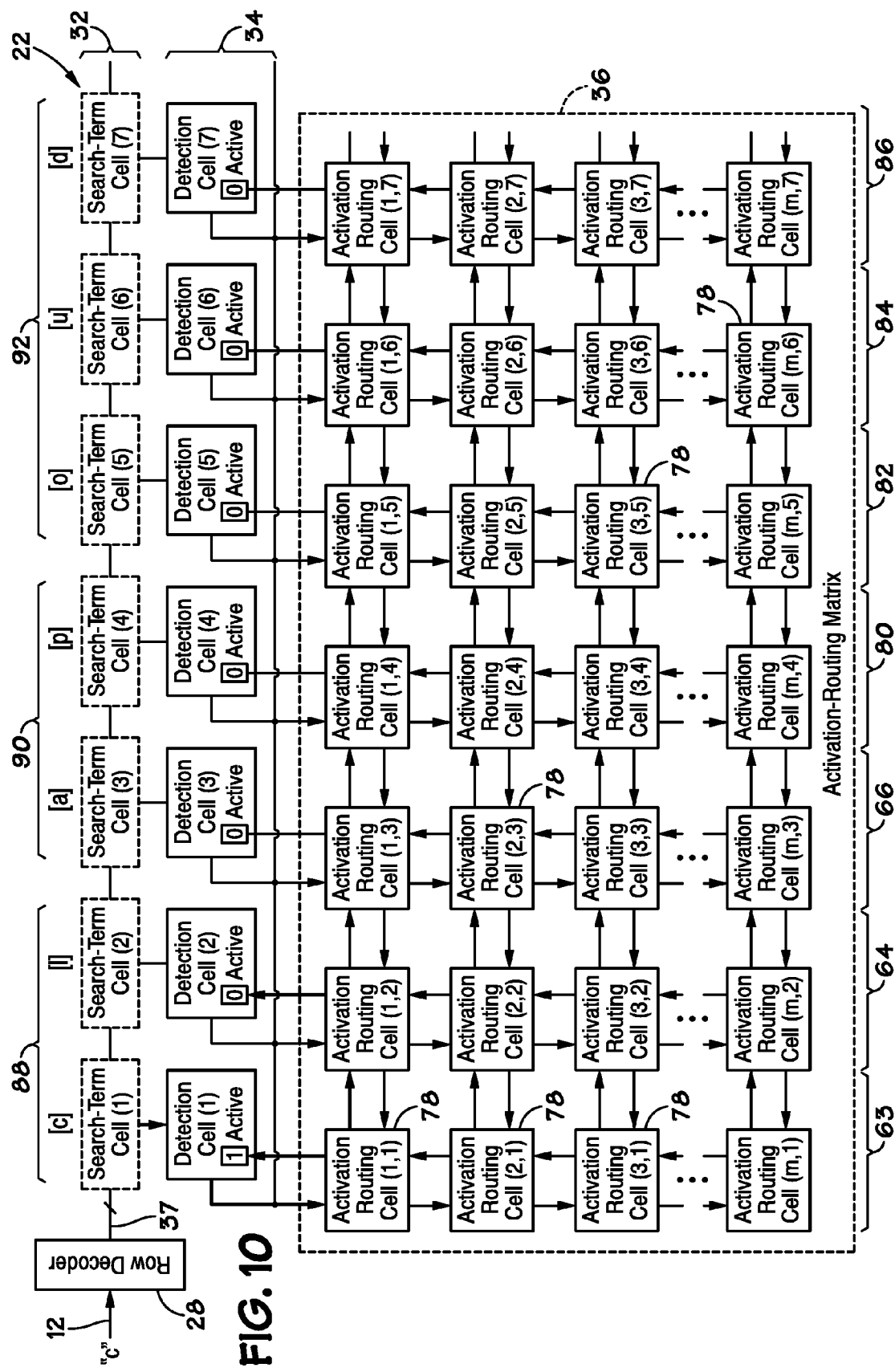
FIGS. 10-12 depict the recognition module searching according to a search criterion that specifies multiple words with the same prefix.
Figure 11:
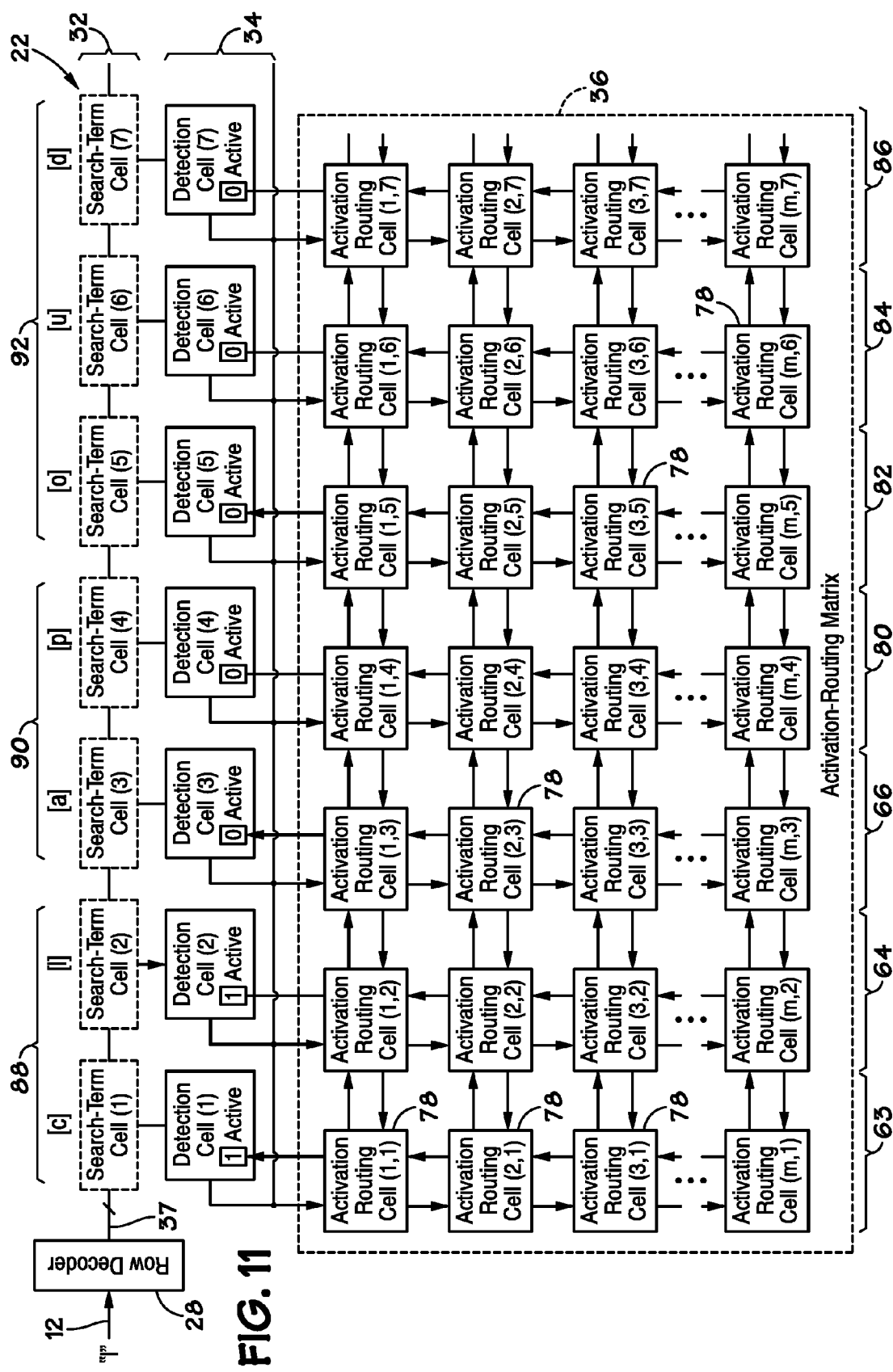
Figure 12:
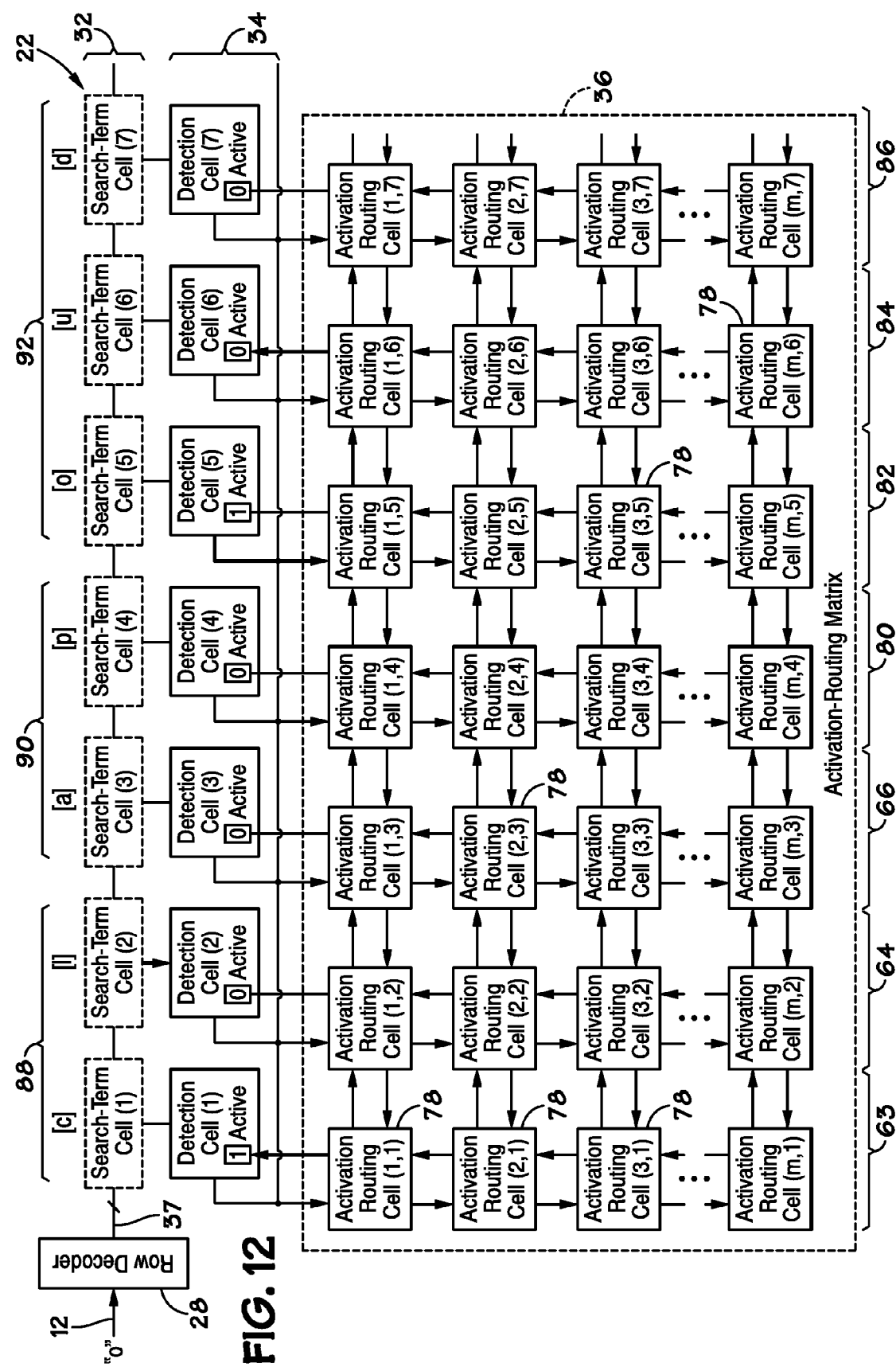

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
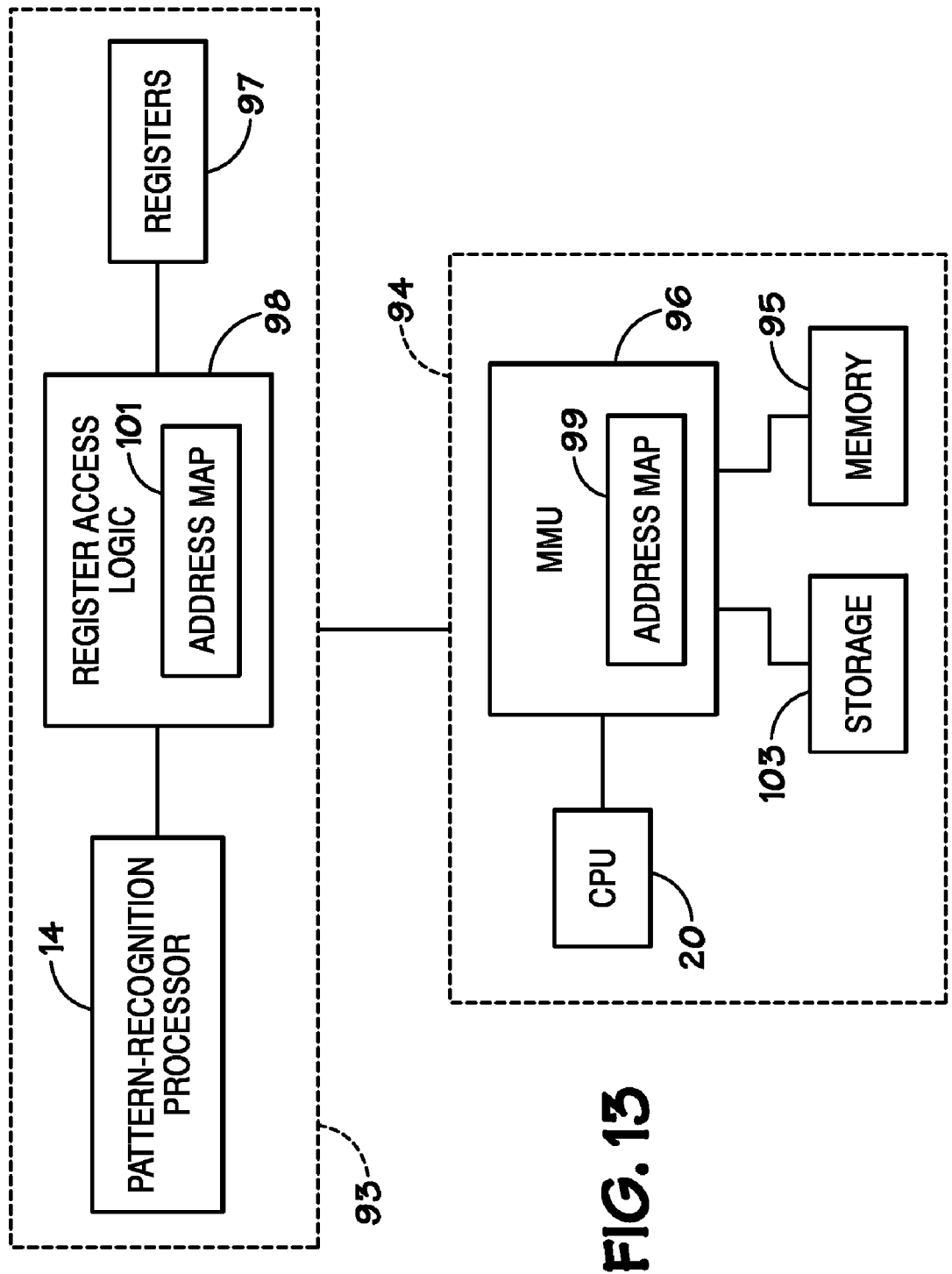
FIG. 13 depicts a pattern-recognition device, which includes the pattern-recognition processor of FIG. 2 and a set of registers, in communication with a processor-based system in accordance with an embodiment of the present invention.

In some embodiments, such as that illustrated in FIG. 13, the pattern-recognition processor 14 may be part of a pattern-recognition device 93 accessed by a controller or some other device or system, such as a host computer system 94. The computer system 94 may include, for example, a processor, such as a central processing unit (CPU) 20, that accesses a memory 95 via a memory management unit (MMU) 96. The memory 95 may include any suitable memory device, including, but not limited to, static random access memory (SRAM), dynamic random access memory (DRAM), or a generation of Double Data Rate (DDR) memory (e.g., DDR1, DDR2, DDR3, or DDR4). Further, the MMU 96 may be provided in a separate hardware component of the system 94, such as a northbridge of a motherboard chipset, or may be integrated into the CPU 20.

The system 94 may also include one or more storage media 103, which may store various data and application instructions that may be loaded into memory 95 and executed by the CPU 20. Such application instructions may include, but are not limited to, operating system routines, firmware, software drivers, and instructions adapted to configure the device 93, as discussed in greater detail below. Moreover, the storage media 103 may include any appropriate devices or manufactures capable of storing such instructions, including a magnetic or solid-state hard drive, a CD-ROM, a flash memory, or some other optical, magnetic, or solid-state media. Moreover, the storage media 103 may include a single such device having all of the application instructions for providing the functionality described herein, or may include multiple devices that collectively include the application instructions. Although device 93 is presently illustrated as separate from the computer system 94, it will be appreciated that some or all of the components of the device 93 and the computer system 94, including, but not limited to, those explicitly illustrated in FIG. 13 and discussed herein, may be integrated into a single device.

In some embodiments the pattern-recognition processor 14, or the device 94 having the pattern-recognition processor 14, may include a plurality of registers 97 to store information related to the pattern-recognition system described above. To facilitate reading and writing data to and from the registers 97, register access logic 98 may manage the access to the registers 97. The register access logic 98 may be implemented in hardware, or in any other suitable manner. In various embodiments, the registers 97 and/or register access logic 98 may be a part of the pattern recognition processor 14, or may be separate from but accessible by the pattern recognition processor 14.

The plurality of registers 97 may include registers that store matching results, counts, configuration information, control information and status, debug information, etc. Any desirable information related to the pattern recognition process described above may be stored in the registers 97. The large quantity of data that may be stored in the registers 97 may result in a relatively large number of registers.

The MMU 96 may use an address map 99, which includes physical memory addresses directly accessible by the CPU 20, to facilitate direct access by the CPU 20 to various memory locations, such as within the memory 95 and the registers 97. The address map 99, however, may have a finite number of addresses that can be mapped to physical memory locations of the system 94 and other devices, such as device 93. For instance, in some embodiments, the system 94 may include a 32-bit address bus that allows $2^{32}$ distinct addresses to be mapped to physical memory locations in the address map 99. In such an embodiment, and given an address space of a fixed size, the number of addresses that may be mapped to physical locations in the memory 95 is inversely related to the number of addresses mapped to physical locations outside the memory 95, such as in the registers 97. For instance, if each address is mapped to a one-byte physical memory location, $2^{32}$ available addresses could be mapped to, and allow direct access by the CPU 20 of, 4 GB of memory. If a substantial number of addresses within the address map 99 were allocated to the registers 97, fewer addresses would be available for mapping to the memory 95, which may reduce the amount of memory 95 accessible to the CPU 20 and result in decreased performance of the system 94. In some embodiments, address space of the system 94 and the address map 99 may be conserved through the indirect addressing techniques discussed below.

In accordance with certain embodiments of the present invention, a majority of the registers 97 may be indirectly accessible by the system 94 (and not included within the address space of the system 94 or address map 99), while a specific subset of registers 97 may be directly accessible by, and included within the memory space of, the system 94. These two types of registers may be referred to as "indirect registers" and "direct registers," respectively. That is, in order to preserve memory address space of a processing system, such as the system 94, a large number of registers may be logically and/or physically located such that they are not directly accessible by the processing unit. These registers may be of any desired size, such as 8-bit registers, 16-bit registers, 32-bit registers, 36-bit registers, 64-bit registers, or the like.

In one embodiment, the device 93 includes a separate address map 101 that may be used to facilitate access to physical locations of the registers 97, and that generally provides a map to the indirect registers not included in the address map 99 of the system 94. As discussed further below, the direct registers also allow access to the indirect registers, and can be used to funnel all requests for access to the indirect registers through the easily accessed direct registers. The direct registers allow rapid access by the system 94 (e.g., by the CPU 20), yet restriction of the direct registers to a subset of the registers 97 reduces the amount of memory address space within system 94 used for the registers 97. While the indirect addressing technique disclosed herein may be employed in conjunction with a pattern-recognition processor in some embodiments, such indirect addressing may also be used in other embodiments that do not include such a pattern-recognition processor.

Figure 14:
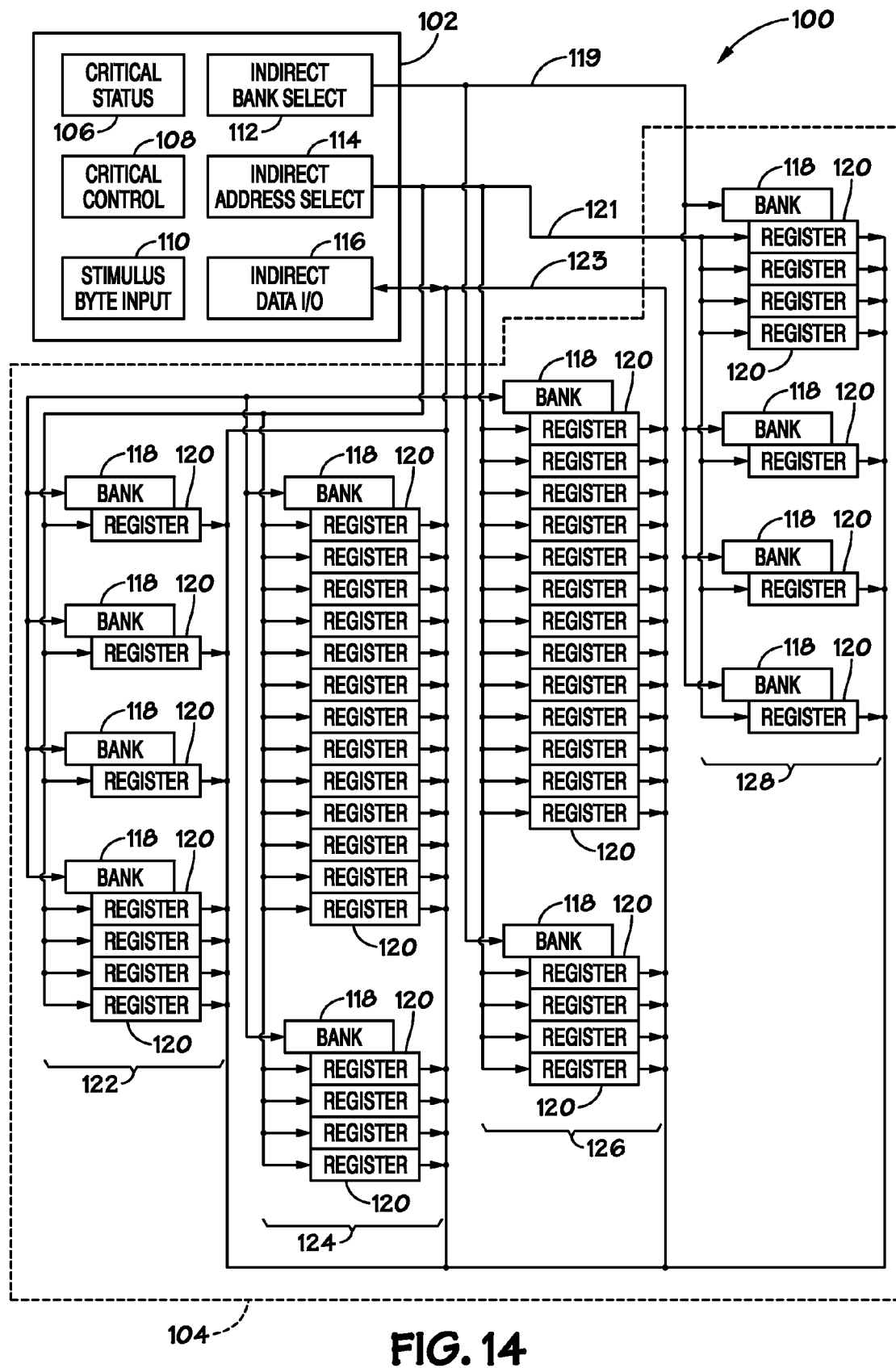
FIG. 14 illustrates a system having direct and indirect registers of the pattern-recognition device of FIG. 13 in accordance with one embodiment.

FIG. 14 illustrates a system 100 having direct and indirect registers of the pattern recognition processor 14 or device 93 in accordance with an embodiment of the present invention. The system 100 includes a direct register set (or group) 102 (also referred to as a "base register set"), and an indirect register set (or group) 104. The base register set 102 may include any number of "critical" registers, that is, those registers where direct accessibility by the system 94 (or some other controller, system, or device) is most desired. In the embodiment illustrated in FIG. 14, the base register set 102 includes six registers, although in other embodiments any number of registers may be used in the base register set 102. Further, it should be appreciated that selection of the "critical" registers used in the base register set 102 is configurable based on the pattern recognition processor 14 and the system. Thus, in other embodiments, some of the registers of the base register set 102 in FIG. 14 may be omitted and other registers may be included in the base register set 102.

In the illustrated embodiment, the base register set 102 includes the following registers: a critical status register 106; a critical control register 108; a stimulus byte input register 110, an indirect bank select register 112; an indirect address select register 114; and an indirect data in/out register 116. In one embodiment, each register of the base register set 102 may be a 32-bit register, and may be accessible over a 32-bit address bus. Further, the registers of the register set 102 may be read/write registers, allowing both reads and writes. As described further below, the indirect bank select register 112, the indirect address select register 114, and the indirect data in/out register 116 aid in accessing the indirect registers 104. These three registers 112, 114, and 116 may collectively be referred to as the "indirect addressing access registers."

The critical status register 106, the critical control register 108, and the stimulus byte input register 110 provide access to functions and information that may be quickly accessed by the system 94 or some other controller, preventing the access delay associated with providing these functions and information via the indirect registers 104. The critical control register 108 provides critical control bits during the pattern matching operation when speed of processing is critical. For example, such bits may include stop/run, reset, DMA start/stop, mode selection, etc. Any other critical control bits may be used in the critical control register 108.

The critical status register 106 provides critical status information during the pattern matching operation. The status information bits stored in the register 106 may be "sticky" bits (updated only when explicitly requested), may be "auto-updated," or may never be updated. Examples of status bits stored in the register 106 may include endian-mode, endianness selection, DMA mode, DMA status, status of matches, detection of matches, etc.

The stimulus-byte input register 110 provides storage of the data to be searched from the data stream 12. Storing the data in the stimulus-byte input register 110 allows parallel functions to occur, speeding up operation of the pattern recognition processor 14. For example, data from the data stream 12 can be processed at the same time as reading of indirect "match results" bank registers.

Figure 16:
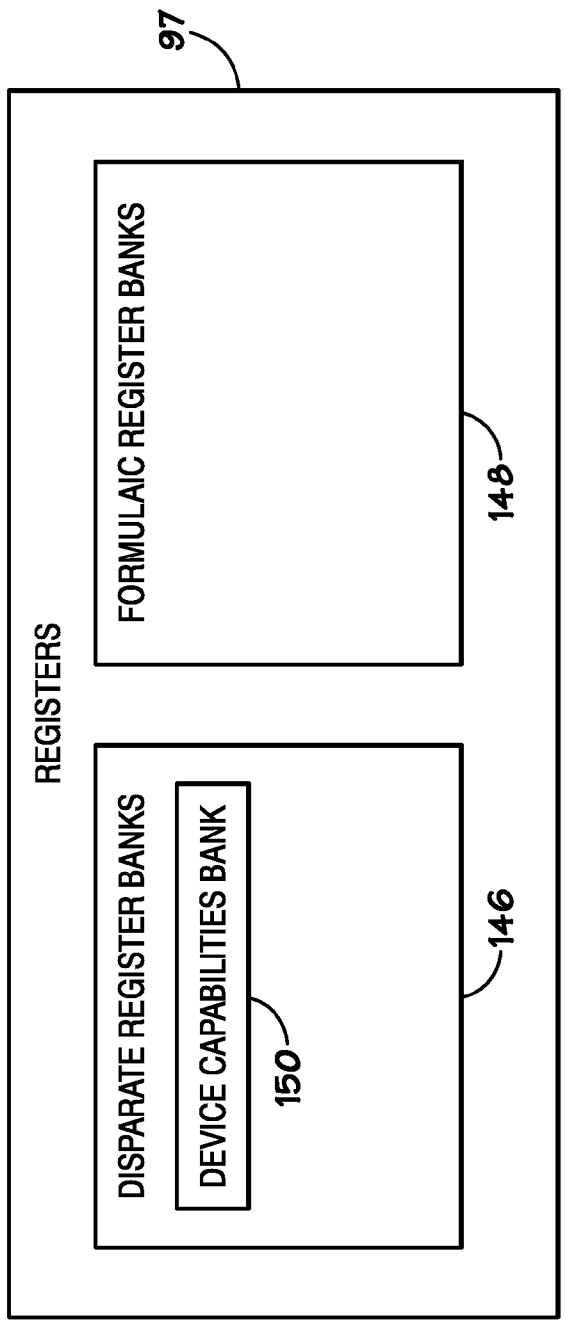
FIG. 16 illustrates the inclusion of disparate register banks and formulaic register banks in the registers of the device of FIG. 13 in accordance with one embodiment.
Figure 19:
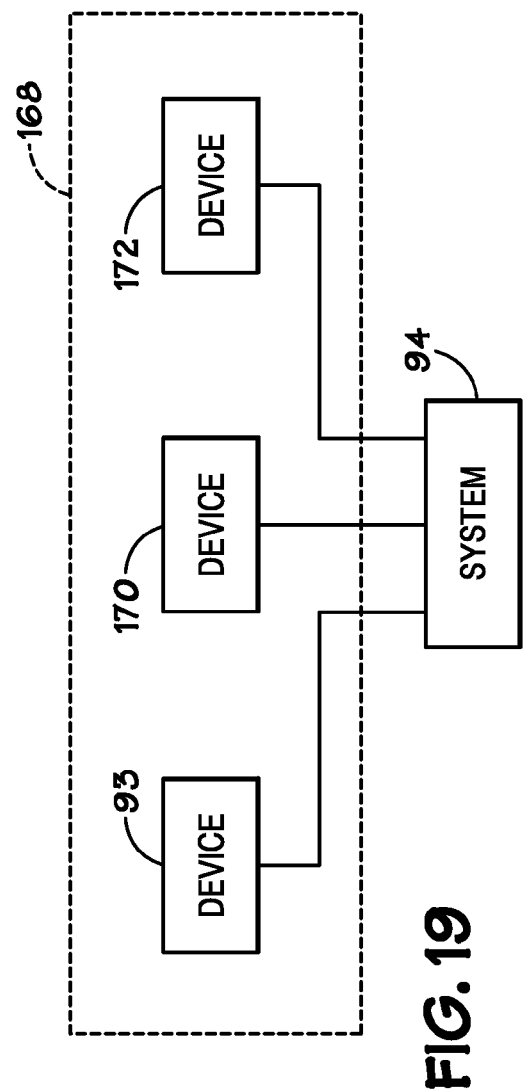
FIG. 19 generally depicts the capability of the system 94 to configure one or more different devices of a family of devices in accordance with one embodiment.

The indirect register set 104 may include any number of register banks 118 comprising one or more registers 120. Various types of indirect register groups are described below. However, it should be appreciated that the groups described are merely exemplary and any other registers, register groups, and/or register banks may be included. The indirect register set 104 may include a flow save and restore group 122, a match result and debug group 124, a power-on configuration group 126, and a pattern configuration group 128. The flow save and restore group 122 may include status indicators and counter values, such as threshold counters, processed byte counters, etc. The match results and debug group 124 may include group logic outputs, recognition array outputs, and any other results and outputs. The power-on configuration group 126 includes registers for identifying and configuring the pattern recognition processor 14, such as a device capabilities bank 150 (FIG. 16), manufacturer identification codes, system parameters, etc. Finally, the pattern configuration group 128 includes functions and information used with the pattern recognition process, such as recognition array state, aggregation functions, etc.

The indirect bank select register 112 selects the bank 118 of the indirect register set 104 to be accessed. Each of the various banks 118 may be selected by a specific address value, as indicated by a bank select bus line 119. In one embodiment, the indirect bank select register 112 may be a 32-bit register. The indirect address select register 114, in turn, sets the specific register 120 to be accessed within the bank of registers selected by the indirect bank register select 112, as indicated by register address bus 121. In each selected bank, the registers start at a zero address. The indirect data in/out register 116 provides the write or read functionality for the indirect register set 104, as indicated by the register data in/out bus 123. Writing to the indirect data in/out register 116 writes data into the register at the address specified by the indirect bank select register 112 and the indirect address select register 114. Reading from the indirect data in/out register 116 reads the register at the address specified by the combination of the indirect bank select register 112 and the indirect address select register 114. Thus, by using the indirect bank select register 112, the indirect address select register 114, and the indirect data in/out register 116, data may be written to or read from the indirect registers 104.

Although certain examples of various features of pattern-recognition processors 14 and devices 93 are provided above, it is noted that the particular capabilities and characteristics of such processors and devices, or of other, non-pattern-recognition devices, may differ from embodiment to embodiment. In some embodiments, a family of devices may share a generally similar set of functionalities (e.g., pattern-recognition functionalities), but each device of the family may include different numbers of components for providing such functionalities. For instance, in addition to other examples provided below, one such device of a family may include approximately 100,000 feature cells 30 (FIG. 2), while two additional devices in the family may include approximately 500,000 feature cells and 1,000,000 feature cells, respectively. As may be appreciated, desired operation of a particular device will often depend on appropriate configuration of the device. Moreover, in a pattern-recognition embodiment, the accuracy of the pattern-recognition device 93 will depend on a proper configuration and control of the feature cells 30, among other components.

Figure 15:
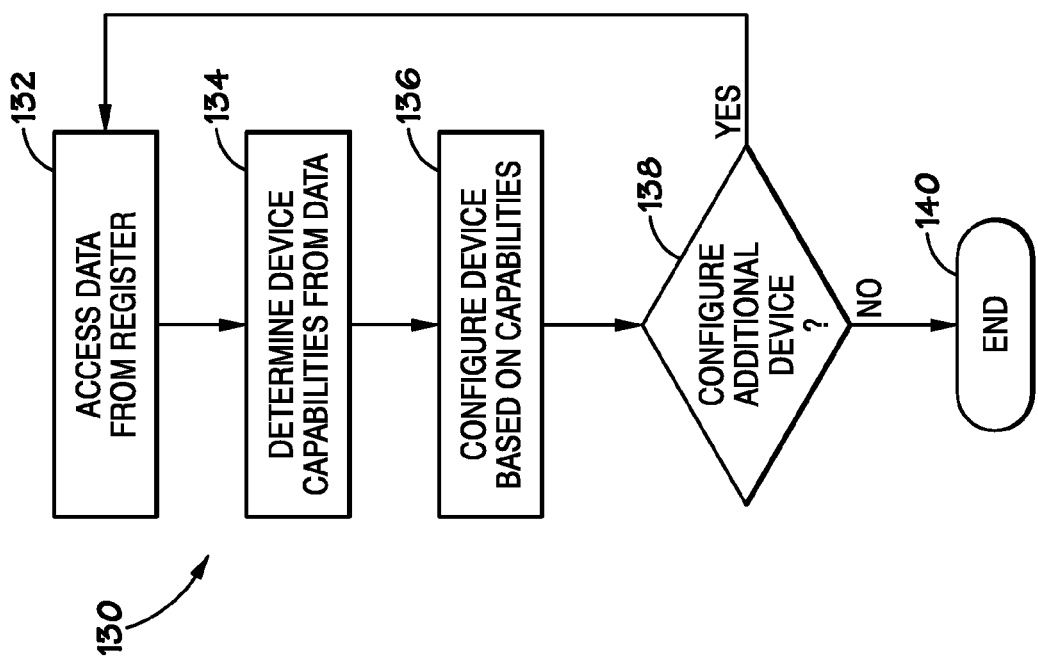
FIG. 15 is a flowchart of a method of configuring a device, such as the pattern-recognition device of FIG. 13, in accordance with an embodiment of the present invention.

Accordingly, a method 130 of configuring a device 93 is generally depicted in FIG. 15 in accordance with one embodiment. While various steps of the method 130 are discussed in greater detail below, the method 130 generally includes a step 132 of accessing data from a memory location, such as from one or more registers of the registers 97, and determining, in a step 134, the capabilities of the device 93 from the accessed data. The method 130 also generally includes a step 136 of configuring the device 93 based on the device capabilities determined in step 134. As indicated by decision block 138, the steps 132, 134, and 136 may be repeated for any additional devices to be configured, before concluding at end block 140.

By way of example, in one embodiment, the method 130 may be employed to index (e.g., map) bit positions of at least some of the registers 97 to particular circuitry of the pattern-recognition processor 14. The registers 97 of one embodiment may be generally divided into two types of register banks: disparate register banks 146 and formulaic register banks 148. The disparate register banks 146 generally include one or more register banks, such as a device capabilities bank 150, in which the registers of each of these banks may differ significantly in definition from the other registers in that bank. It is noted that the one or more registers of the device capabilities bank 150 are generally encoded with values indicative of the capabilities of the device 93, and may include read-only registers. For such disparate register banks 146, the mapping of device functionalities to the registers may be done through a table, such as the following:

TABLE 1

Example of Mapping a Disparate Bank

| Register Name | Register Description | Indirect Address |
|---|---|---|
| Reg_1 | Description of the function and/or contents of Reg_1 | 0x00000000h |

TABLE 1-continued

Example of Mapping a Disparate Bank

| Register Name | Register Description | Indirect Address |
|---|---|---|
| Reg_2 | Description of the function and/or contents of Reg_2 | 0x00000001h |
| ... | ... | ... |
| Reg_N | Description of the function and/or contents of Reg_N | 0x0000000Nh |

Each register of a disparate register bank 146 may include a unique description, and indirect register addresses may be directly associated with these unique descriptions in a non-formulaic manner.

Unlike the disparate register banks 146, however, the formulaic register banks 148 may include register banks having registers that are substantially identical in definition to the other registers within that bank. For example, registers for configuring the pattern-recognition processor 14 to search for particular data patterns (e.g., pattern configuration group 128), or for managing the data flow save and restore operations (e.g., register group 122) may differ from one another only in the mapping of the registers (and bits thereof) to one or more logic cells (e.g., feature cells 30, search-term cells 54, detection cells 68, activation-routing cells 78, logic cells of other arrays), or other components. In some embodiments, some or all of the formulaic register banks 148 may be associated with the various arrays of logic cells described above with respect to FIGS. 2-12. Such logic cells may include, but are not limited to, logic cells of the search-term array 32, the detect array 34, the activation-routing matrix 36, the aggregation-routing matrix 42, the threshold logic matrix 44, the logical-product matrix 46, the logical-sum matrix 48, and the initialization routing matrix 50. The various logic cells of the device 93, such as those of the pattern-recognition processor 14, may each receive unique control or configuration signals to facilitate device functionality, and such signals may be stored in the registers 97.

For example, certain register bits of a register bank may be used to set the feature cell 63 (FIG. 6) to detect the letter "b", other register bits of the bank may set the feature cell 64 to detect the letter "i", while still other register bits of the bank may set the feature cell 66 to detect the letter "g". Also, other register bits in another register bank may control routing of signals forward and backward through an array of logic cells, such as the activation-routing matrix 36 (FIG. 10). In at least one embodiment, the method 130 may be used to configure the device 93 by indexing some or all of the formulaic register banks 148 to logic cells or other components of the pattern-recognition processor 14 such that control signals stored in registers of the formulaic register banks 148 are routed to the appropriate logic cell or component.

The number of registers in a given bank may be dictated by the width of each register and the number of columns and rows of logic cells in an array to be configured. For instance, in one embodiment the activation-routing matrix 36 could include 512 columns and eight rows of activation-routing cells 78, for a total of 4,096 activation-routing cells 78. Each activation-routing cell 78 could be controlled by some number of one or more control signals unique to that activation-routing cell, such as a set of three control signals CTL-1, CTL-2, and CTL-3, respectively.

In such an example, the control signals may be stored in respective register banks. If each of the three control signal register banks included 32-bit registers, and one register bit is needed to store each control signal to a particular activation-routing cell, the number of bits per control signal register bank would be equal to the number of activation-routing cells 78, and the number of registers in each bank would be equal to the total number of the cells 78 divided by the width of the registers. Thus, in the present example, some of the registers 97 may be organized into a CTL-1 register bank of 128 registers including all 4,096 of the CTL-1 control signal bits for the activation-routing matrix 78, a CTL-2 register bank of 128 registers including all of the CTL-2 control signal bits for the activation-routing matrix 78, and a CTL-3 register bank of 128 registers similarly including all of the CTL-3 control signal bits for the activation-routing matrix 78. While certain examples have been provided herein for the sake of clarity, it is noted that a device may have many other logic cells or components that are governed according to control signals stored in registers of the device.

Figure 17:
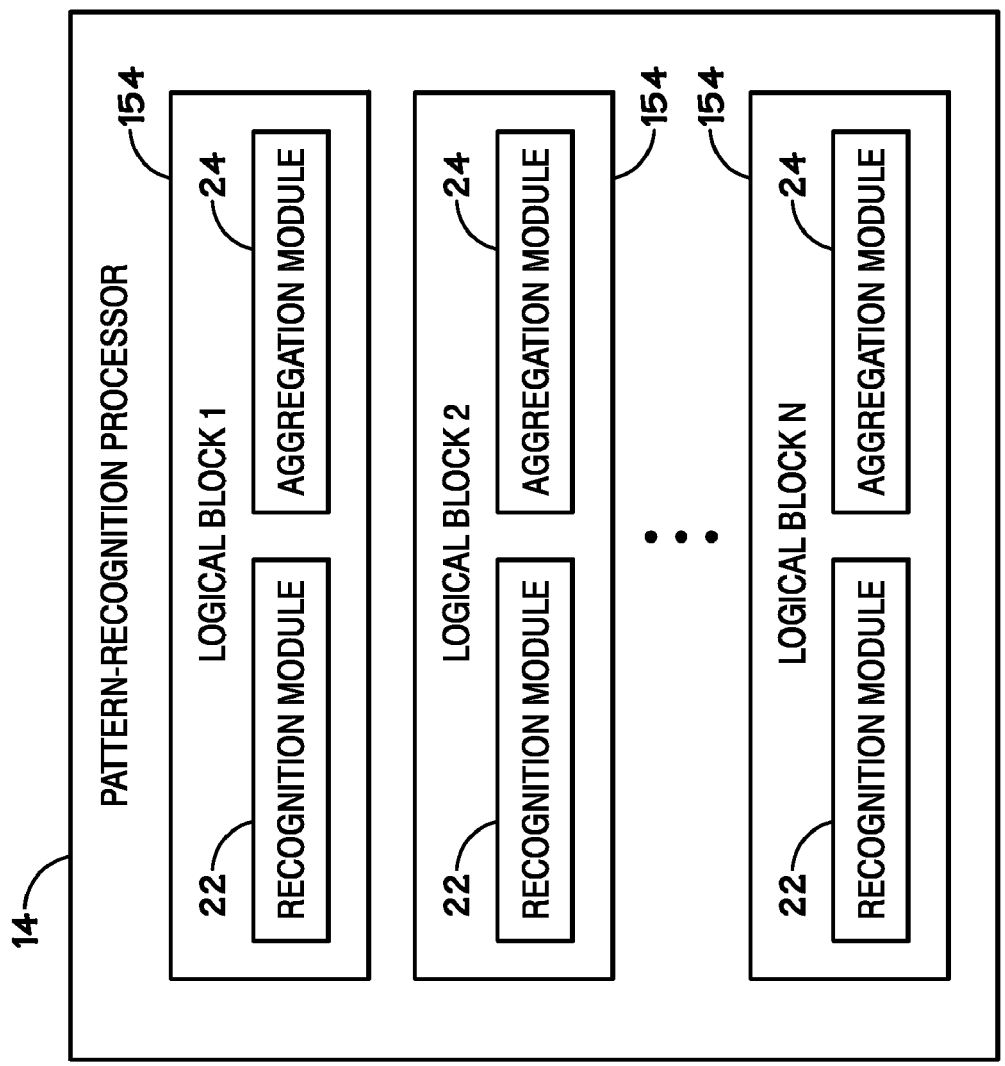
FIG. 17 depicts additional details of the pattern-recognition processor of FIG. 2 in accordance with one embodiment.

As generally noted above, different devices 93 may have different characteristics, capabilities, or numbers of components for providing such capabilities. With respect to pattern-recognition embodiments, the pattern-recognition processors 14 of such devices may include numerous differences beyond their total number of feature cells 30. For instance, as generally depicted in FIG. 17, the circuitry of pattern-recognition processors 14 may be divided into one or more logical blocks 154, each having a recognition module 22 and an aggregation module 24 as discussed above with respect to FIGS. 2-12. Further, such pattern-recognition processors may differ in the number of logical blocks that they include, as well as the characteristics of each of the logical blocks. Non-limiting examples of such differences may be number of feature cells 30 per block, the number of forward and reverse activation and/or routing lines per block (e.g., the lines passing signals between activation-routing cells 78 in FIG. 10), the number of logical products per block, the number of logical sum of products per block, or the number of threshold counters per block.

To facilitate configuration of such various devices 93, the characteristics and capabilities of a particular device 93 may be stored in the device capabilities bank 150 of the device 93, allowing the characteristics and capabilities to be accessed from one or more registers of the device capabilities bank 150 in step 132 of the method 130 (FIG. 15). In one embodiment, the capabilities and characteristics of each device 93 is generally stored in the one or more registers of its capabilities bank 150 by the device manufacturer. The register data representative of these capabilities may be accessed by a configuring system 94 in accordance with device drivers or other software stored in the system 94 (e.g., in the storage media 103) and configured to read and interpret such data. In one example of a pattern-recognition device 93, a device capabilities bank 150 may include the following registers:

TABLE 2

Device Capabilities Registers Summary

| Register Name | Register Description | Indirect Address |
|---|---|---|
| Blocks | Number of logical blocks contained in device | 0x00000000h |
| FC# | Number of feature cells per Block | 0x00000001h |
| FP# | Number of forward activation/routing lines per block | 0x00000002h |
| RP# | Number of reverse activation/routing lines per block | 0x00000003h |
| GLL# | Number of group logic lines | 0x00000004h |
| CTR# | Number of threshold counters per block | 0x00000005h |
| Bits# | Number of bits per threshold counter | 0x00000006h |

TABLE 2-continued

Device Capabilities Registers Summary

| Register Name | Register Description | Indirect Address |
|---|---|---|
| P# | Number of logical products per block | 0x00000007h |
| SP# | Number of logical sum of products per block | 0x00000008h |
| RSV# | Number of re-initialization lines per block | 0x00000009h |
| P#Bits | Number of bits in processed-byte counter | 0x0000000Ah |
| M#Bits | Number of bits in match counter | 0x0000000Bh |
| FIFO# | Match bank FIFO registers depth | 0x0000000Ch |

Of course, it will be appreciated that the device capabilities bank 150 may include less than all of the registers indicated in the table above, or may include other registers in addition to, or instead of, those indicated above. Based on such data, a configuring system (e.g., system 94 of FIG. 13) may determine the characteristics and capabilities of the device 93 in step 134 and then configure the device 93 in step 136. As will be appreciated, such determination and configuration may be performed by the system 94 in accordance with various software or firmware stored within the device 94 and executed by the CPU 20.

Figure 18:
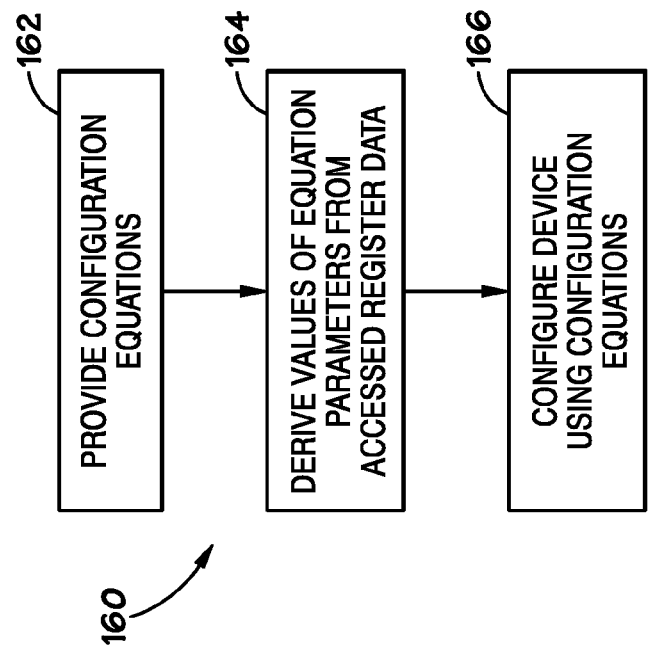
FIG. 18 illustrates one example of a method of configuring the device of FIG. 13 in an adaptable manner through use of parametric equations.

In one embodiment, the step 136 of configuring the device 93 may be automatically performed via the method 160 generally illustrated in FIG. 18. Particularly, in this embodiment, various configuration equations may be provided in a step 162. For instance, such configuration equations may be stored in the storage media 103 of the system 94. These configuration equations may include various parameters generally associated with characteristics of a device 93 to be configured. For instance, in one embodiment, such parameters may include the following:

TABLE 3

Device Capabilities Parameter Definitions

| Register Name | Description | Parameter Name | Index Name, Range, and Value Equation |
|---|---|---|---|
| Blocks | Number of logical blocks in device | N | n<br>$n_{max} = (N - 1)$<br>$0 <= n <= (N - 1)$ |
| FC# | Number of feature cells per block | I | i<br>$i_{max} = (I - 1)$<br>$0 <= i <= (I - 1)$ |
| FP# | Number of forward activation/routing lines per block | $J_f$ | $j_f$<br>$j_f max = (J_f - 1)$<br>$0 <= j_f <= (J_f - 1)$ |
| RP# | Number of reverse activation/routing lines per block | $J_r$ | $j_r$<br>$j_r max = (J_r - 1)$<br>$0 <= j_r <= (J_r - 1)$ |
| GLL# | Number of group logic lines per block | M | m<br>$m_{max} = (M - 1)$<br>$0 <= m <= (M - 1)$ |
| CTR# | Number of threshold counters per block | C | c<br>$c_{max} = (C - 1)$<br>$0 <= c <= (C - 1)$ |
| Bits# | Number of bits per threshold counter | B | b<br>$b_{max} = (B - 1)$<br>$0 <= b <= (B - 1)$ |
| P# | Number of logical products per block | P | p<br>$p_{max} = (P - 1)$<br>$0 <= p <= (P - 1)$ |
| SP# | Number of logical sum of products per block | SP | sp<br>$sp_{max} = (SP - 1)$<br>$0 <= sp <= (SP - 1)$ |
| RSV# | Number of re-initialization lines per block | RSV | rsv<br>$rsv_{max} = (RSV - 1)$<br>$0 <= rsv <= (RSV - 1)$ |

TABLE 4

Fixed Parameters

| Parameter Name | Description | Index Range and Value Equation |
|---|---|---|
| sb | The 8 to 256 decode of the 8-bit stimulus-byte | $0 <= sb <= 255$<br>(00h to FFh) |
| INT | Register bit-width | 32 (20h) for all registers |
| Tl | Threshold logic lines (Always equals the number of GLLs, M) | Tl<br>$Tl_{max} = (M - 1)$<br>$0 <= Tl <= (M - 1)$ |

The configuration equations provided in step 162 may be adapted to configure the device 93 according to its particular capabilities. In an embodiment having the parameters set forth above in Tables 3 and 4, the configuration equations provided in step 162 may include those provided in the following table for calculating the number of registers to be included in various register banks of the formulaic register banks 148.

TABLE 5

Equations for the Total Number of Registers per Formulaic Bank

| Bank Name | Full "Descriptive" Bank Name | Equation for Calculating the Number of Registers in the Bank |
|---|---|---|
| Pattern Configuration Group | | |
| RES_MEM | Latent Response Memory Pattern Bank | N * RC * 256 |
| INI_ST | Recognition Array Initial State Bank | N * RC |
| AF | Activate on this Forward Routing Line | N * RC * $J_f$ |
| SF | Send output on this Forward Routing Line | N * RC * $J_f$ |
| PF | Pass this Forward Routing Line on thru | N * RC * $J_f$ |
| AR | Activate on the Reverse Routing Line | N * RC * $J_r$ |
| SR | Send output on this Reverse Routing Line | N * RC * $J_r$ |
| PR | Pass this Reverse Routing Line on thru | N * RC * $J_r$ |
| LnL | Latched or non-Latched version of Recognition Array output | N * RC * M |
| ENA | Enable aggregation of the Recognition Array output | N * RC * M |
| CRB | Re-Initialize on this RSV signal | N * RC * M |
| TLMC | Initial count value for each Threshold CTR | N * C<br>[bits per counter <= INT] |
| SelLPM | Select this Tl line to be included in the Logical Product Term | N * P<br>[Tl lines <= INT] |
| DnDLPM | Select Tl or NOT_Tl to be included in the Logical Product Team | N * P<br>[Tl lines <= INT] |
| SelLSM | Select the P line to be included in the Logical Sum of Products Term | N * SP<br>[P lines <= INT] |
| DnDLSM | Select P or NOT_P to be included in the Logical Sum of Products Term | N * SP<br>[P lines <+ INT] |
| RiRM | Re-Initialize on this SP term (output the RSV signal) | N * RSV<br>[SP lines <= INT] |
| Flow Save & Restore Group | | |
| ACT_ST | Current Active State Bank | N * RC |
| LATCH | Latch Matrix State | N * RC |
| TH_VAL | Threshold Counter Value | N * C<br>[bits per counter <= INT] |

TABLE 5-continued

Equations for the Total Number of Registers per Formulaic Bank

| Bank Name | Full "Descriptive" Bank Name | Equation for Calculating the Number of Registers in the Bank |
|---|---|---|
| Match Results & Debug Group | | |
| MATCH | Match Results Bank | N * 13 |
| GLL_OUT | Group Logic Line Outputs | N * 1 [M <= INT] |
| REC_OUT | Recognition Array Outputs | N * RC |
| CUR_MM | Current Match Matrices | N * 4 |

For the equations above, the factor RC may refer to a number of register-columns and is included in consideration of that the number of registers needed for a particular register bank may depend on the number of feature cells in a logical block, and the number of bits in a single register. The generalized equation for RC (which allows the number of feature cells (I) to be independent of the number of bits in the registers (INT)) may be provided by:

$$(I+INT-1)/INT = RC$$

This generalized equation allows all of the data bits for a particular register bank to be "packed" into the minimum number of registers. However, in some embodiments, I may be constrained to be an integer multiple of INT, and RC may be defined as follows:

$$(I/INT) = RC$$

Further, it is noted that each of the register banks of Table 5 may include all of the registers associated with the noted function for every block in the device, with a contiguous address space that crosses block boundaries. For instance, all of the AF registers for multiple logical blocks of a pattern-recognition processor may be included in the AF Register Bank. Also, from the equations above, it will be apparent that the various register banks may have the same or different numbers of registers compared to one another.

In a step 164, the configuring system or device, such as the system 94, may define the values for various device parameters, including but not limited to those discussed above, from the register data accessed from the device capabilities bank 150. The configuration equations may then be used, in a step 166, to configure the device 93. For instance, in one embodiment, the equations may facilitate mapping of bits of the formulaic register banks 148 to particular portions of the pattern-recognition circuitry discussed herein. In such an embodiment, the configuration equations provided in step 162 may further include equations for indexing (e.g., mapping) each bit in the formulaic register banks 148.

TABLE 6

Examples of Equations for Indexing into Register Banks

| Bank Name | Indexing Parameters | Equation for Indexing to a Specific Point |
|---|---|---|
| RES_MEM | n, I, sb (constant INT) | Bit = (i modulo INT)<br>Bank Register = [(n * RC * 256) + ((i/INT) * 256) + (sb)] |
| INI_ST | n, i (constant INT) | Bit = (i modulo INT)<br>Bank Register = [(n * RC) + (i/INT)] |
| AF, SF, and PR | N, I, $j_f$ (constants I, $J_f$, and INT) | Bit = (i modulo INT)<br>Bank Register = [(n * RC * $J_f$) + ((i/INT) * $J_f$) + ($j_f$)] |
| AR, SR, and PR | n, i, $j_r$ (constants I, $J_r$, and INT) | Bit = (i modulo INT)<br>Bank Register = [(n * RC * $J_r$) + ((i/INT) * $J_r$) + ($j_r$)] |
| ENA, CRB, and LnL | n, i, m (constants I and INT) | Bit = (i modulo INT)<br>Bank Register = [(n * RC * M) + ((i/INT) * M) + (m)] |
| TLMC | n, b, c (constants C and INT) | Bit = (b modulo INT)<br>Bank Register = [(n * C) + c] |
| SelLPM and DnDLPM | n, Tl, p (Constants M, P, and INT) | Bit = (Tl modulo INT)<br>Bank Register = [(n * ((M + INT − 1)/INT) * P) + ((Tl/INT) * P) + (p)] |
| SelLSM and DnDLSM | n, p, sp (Constants P, SP, INT) | Bit = (p modulo INT)<br>Bank Register [(n * ((P + INT − 1)/INT) * SP) + ((p/INT) * SP) + (sp)] |
| RiRM | n, sp, rsv (Constants SP and INT) | Bit = (sp modulo INT)<br>Bank Register = [(n * ((SP + INT − 1)/INT) * RSV) + ((sp/INT) * RSV) + (rsv)] |
| REC_OUT | n, i (constant INT) | Bit = (i modulo INT)<br>Bank Register = [(n * RC) + (i/INT)] |
| GLL_OUT | n, m (constant INT) | Bit = (m modulo INT)<br>Bank Register = [(n) + (m/INT)] |
| ACT_ST | n, i (constant INT) | Bit = (i modulo INT)<br>Bank Register = [(n * RC) + (i/INT)] |
| LATCH | n, i (constant INT) | Bit = (i modulo INT)<br>Bank Register = [(n * RC) + (i/INT)] |
| TH_VAL | n, b, c (constants C and INT) | Bit = (b modulo INT)<br>Bank Register = [(n * C) + c] |

As will be appreciated from the above discussion of certain examples of embodiments, the system 94 may read the capabilities of the device 93 from the device itself, and then configure the device 93 based on its own unique capabilities. In an additional embodiment, the system 94 may configure any or all devices of a family 168 of devices having different characteristics or capabilities. For instance, in addition to being able to configure a device 93 that may have 100,000 feature cells, the system 94 may also configure devices 170 and 172 having, for example, 500,000 and 1,000,000 feature cells, respectively. The system 94 may access the capabilities of each device of the family 168 and configure that device based on its own unique capabilities. As the configuration of each device is adaptable based on the capabilities of the device, the system 94 enables flexible and adaptable configuring of each device of the family 168 of devices without requiring modification of the software or drivers of the system 94 for communicating with such devices. Further, in contrast to a rigid configuration system in which registers for the various functions are forced to be at a pre-determined address, the instant techniques facilitate experimentation and later development of other devices in the family 168, also without requiring the configuration software to be modified. Finally, it is noted that, in at least one embodiment, any or all of the presently disclosed techniques may be used in conjunction with one or more of the techniques described in co-pending U.S. patent application Ser. No. 12/253,966, filed on Oct. 18, 2008, and entitled "System and Method of Indirect Register Access," and in co-pending U.S. patent application Ser. No. 12/253,967, filed on Oct. 18, 2008, and entitled "Indirect Register Access Method and System."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
a device including a plurality of memory locations, the plurality of memory locations including a set of memory locations encoded with device capability data, wherein the device is a pattern-recognition device;
wherein the system is configured to access the device capability data from the set of memory locations and configure the device based on the device capability data, wherein configuring the device includes automatically calculating a number of device registers to be included in a bank of indirect registers.

2. The system of claim 1, wherein the device is one device of a family of devices, the family of devices including an additional device having different capabilities than the one device, and wherein the system is configured to automatically configure the additional device based on additional device capability data accessed from one or more memory locations of the additional device.

3. The system of claim 1, comprising a processor, wherein the system is configured to enable the processor to access the device capability data from the set of memory locations.

4. The system of claim 3, comprising a storage medium encoded with executable instructions configured to effect, upon execution by the processor:
accessing of the device capability data from the set of memory locations; and
automatic configuration of the device based on the device capability data and an equation encoded in the storage medium.

5. The system of claim 4, wherein the executable instructions include instructions configured to define values of parameters of the equation from the accessed device capability data.

6. The system of claim 3, wherein the device includes at least one of the processor or a storage medium.

7. The system of claim 1, wherein the plurality of memory locations includes an additional set of memory locations.

8. The system of claim 7, wherein the additional set of memory locations include a set of registers, and the system is configured to logically organize the set of registers into a plurality of register banks based on the device capability data.

9. The system of claim 8, wherein at least two of the register banks of the plurality of register banks have different numbers of registers.

10. The system of claim 1, wherein the device includes a plurality of logical blocks, and the set of memory locations encoded with device capability data includes at least one memory location encoded with device capability data representative of capabilities of a logical block of the plurality of logical blocks.

11. The system of claim 1, wherein the set of memory locations includes a read-only memory location encoded with device capability data.

12. The system of claim 1, wherein the system is configured to automatically configure the device based on the device capability data.

13. The system of claim 1, wherein the system is configured to configure the device based solely on the device capability data.

14. A method comprising:
accessing data stored in one or more registers of a plurality of registers, the accessed data including capability data representative of capabilities of a device, wherein the device is a pattern-recognition device; and
automatically configuring the device based in part on the accessed capability data, wherein automatically configuring the device includes automatically calculating a number of device registers to be included in a bank of indirect registers.

15. The method of claim 14, wherein accessing data stored in one or more registers of a plurality of registers includes accessing data stored in one or more registers of the device.

16. The method of claim 14, wherein accessing data stored in one or more registers of a plurality of registers includes accessing capability data representative of capabilities of the pattern-recognition device.

17. The method of claim 16, wherein accessing capability data includes accessing data representative of a number of logical blocks of the pattern-recognition device.

18. The method of claim 16, wherein accessing capability data includes accessing data representative of a number of feature cells per logical block of the pattern-recognition device.

19. The method of claim 16, wherein accessing capability data includes accessing data representative of at least one of a number of forward activation lines per logical block or a number of reverse activation lines per logical block of the pattern-recognition device.

20. The method of claim 14, wherein automatically configuring the device includes automatically indexing the plurality of registers to indirect register addresses for the device.

21. A method comprising:
accessing data stored in one or more registers of a plurality of registers, the accessed data including capability data representative of capabilities of a device, wherein the device is a pattern-recognition device; and
automatically configuring the device based in part on the accessed capability data, wherein automatically configuring the device includes automatically indexing the plurality of registers to indirect register addresses for the device;
wherein automatically indexing the plurality of registers to indirect register addresses includes:
defining parameters of at least one equation, based on the accessed capability data; and
indexing a bit in a register of the plurality of registers to an indirect register address, based on the at least one equation.

* * * * *